Nov. 25, 1924.

M. H. BLANK

WHEEL

Filed Nov. 18, 1920      3 Sheets-Sheet 1

1,516,664

Inventor:
Merton H. Blank
by
B. D. Watts
Attorney.

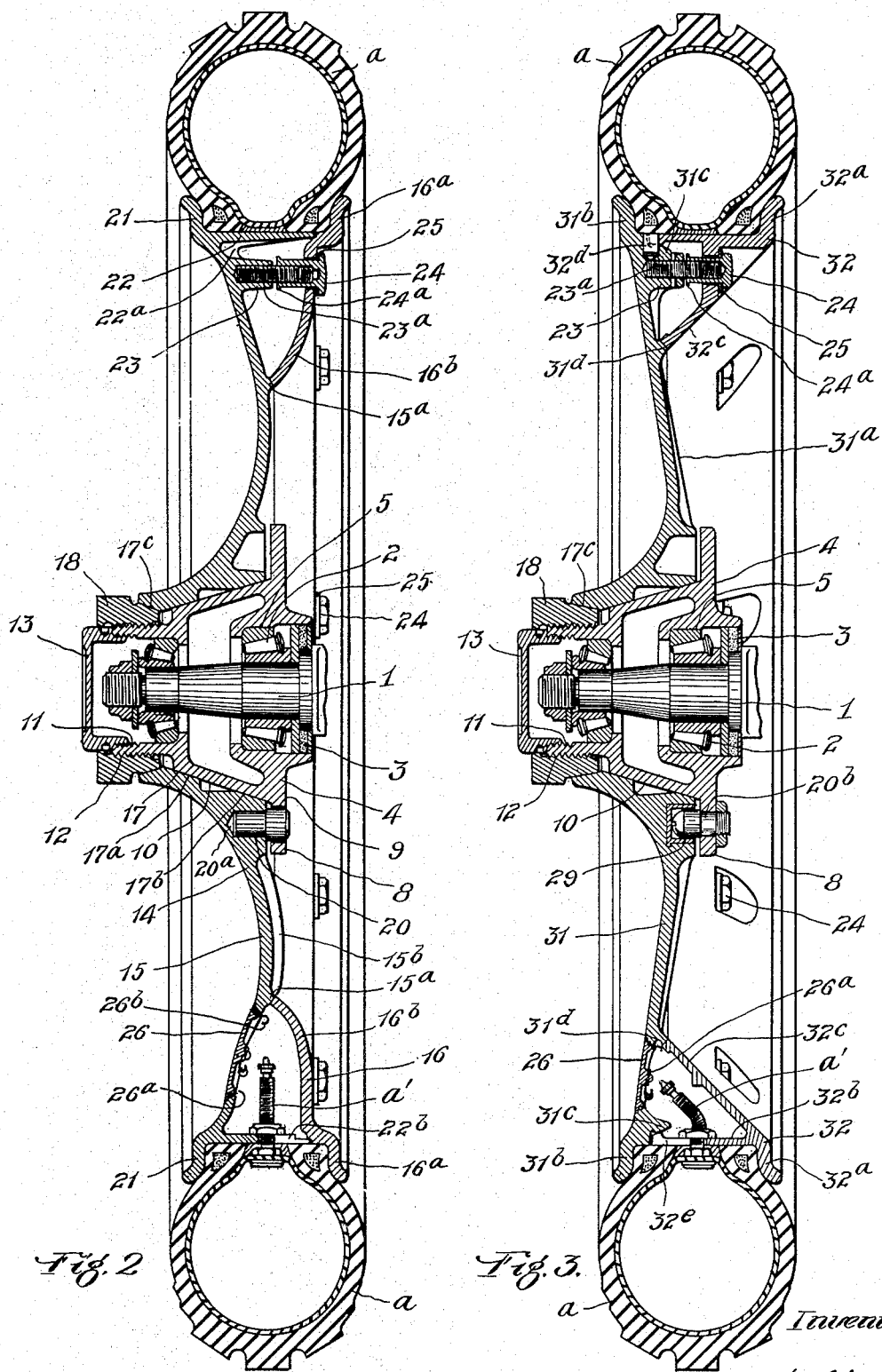

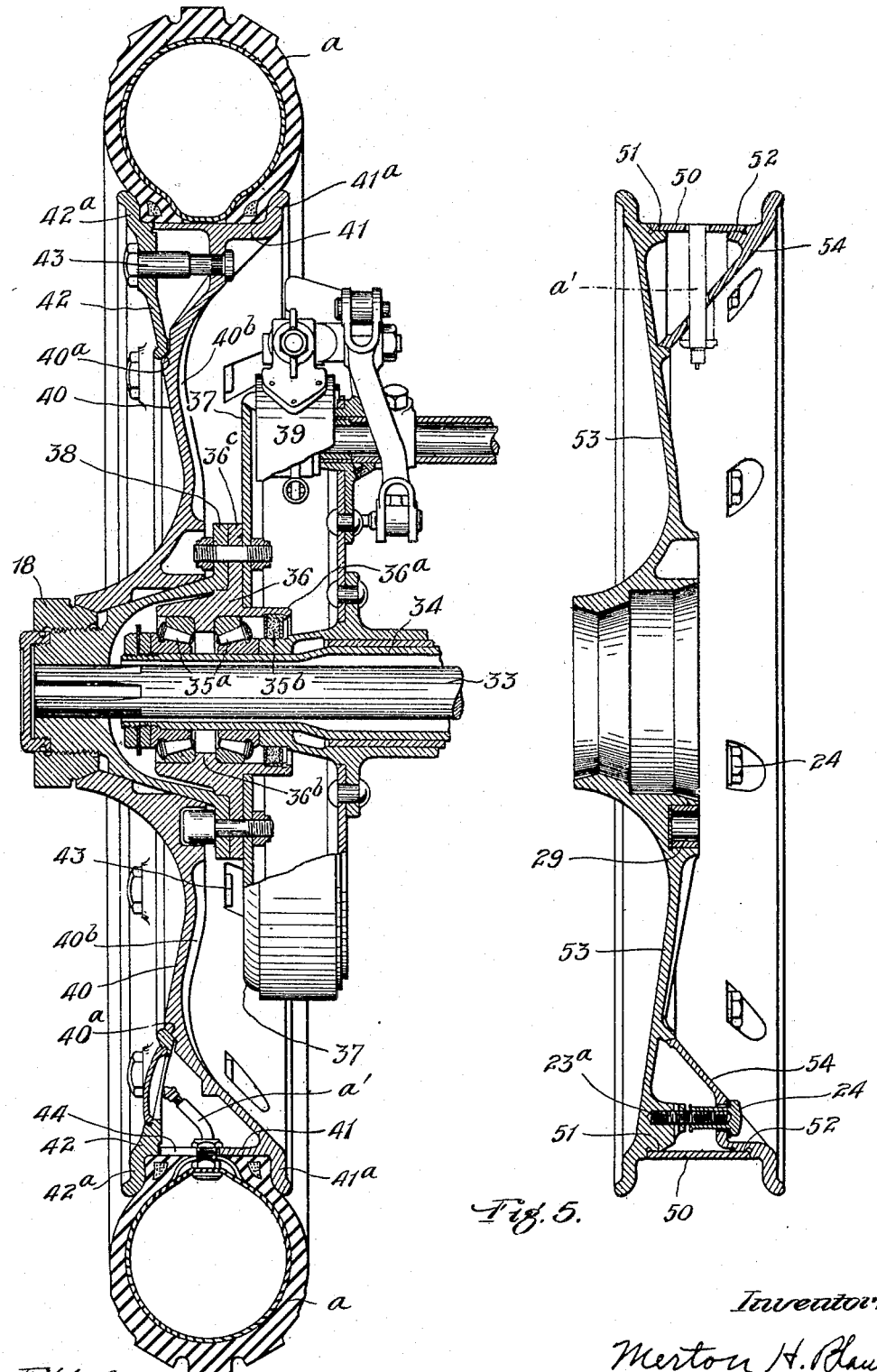

Patented Nov. 25, 1924.

1,516,664

UNITED STATES PATENT OFFICE.

MERTON H. BLANK, OF CLEVELAND, OHIO, ASSIGNOR, BY MESNE ASSIGNMENTS, TO ALUMINUM MANUFACTURES, INCORPORATED, OF CLEVELAND, OHIO, A CORPORATION OF DELAWARE.

WHEEL.

Application filed November 18, 1920. Serial No. 424,817.

*To all whom it may concern:*

Be it known that I, MERTON H. BLANK, a citizen of the United States, residing at Cleveland, in the county of Cuyahoga and State of Ohio, have invented certain new and useful Improvements in Wheels, of which the following is a specification, reference being had therein to the accompanying drawings.

This invention relates to wheels for vehicles and is concerned especially with metal wheels having a hollow rim construction.

One object of the invention is to construct a metal wheel of light weight and ample strength.

Another object of the invention is to provide a metallic wheel which can satisfactorily be made entirely of aluminum alloys.

Another object of the invention is to provide an aluminum alloy vehicle wheel having certain parts which can be easily and cheaply made by casting and other parts which can be made by forging, rolling or pressing.

Another object of the invention is to provide a wheel having an improved box-like peripheral structure.

Another object of the invention is to provide a wheel having an exterior face composed of unobstructed curving surfaces which are combined to give an appearance pleasing to the eye.

Another object of the invention is to provide an improved hub construction for detachable light metal wheels.

Another object of the invention is to construct a wheel which will be cheap and easy to manufacture.

Other objects in view will appear from the description and drawings which form parts of this specification.

In the attached drawings illustrating my invention and forming a part of this specification:

Fig. 2 is a cross section taken on line 2—2 of Fig. 1 showing the preferred form of wheel assembled with a front or non-driving axle.

Fig. 3 is a section similar to that of Fig. 2 but showing a modified form of construction.

Fig. 4 is a similar section of another modified type of construction assembled with a rear or driving axle.

Fig. 5 is a fragmentary cross section of another modified form of rim construction showing a tire supporting rim separate from the wheel body and ring.

Figure 1:
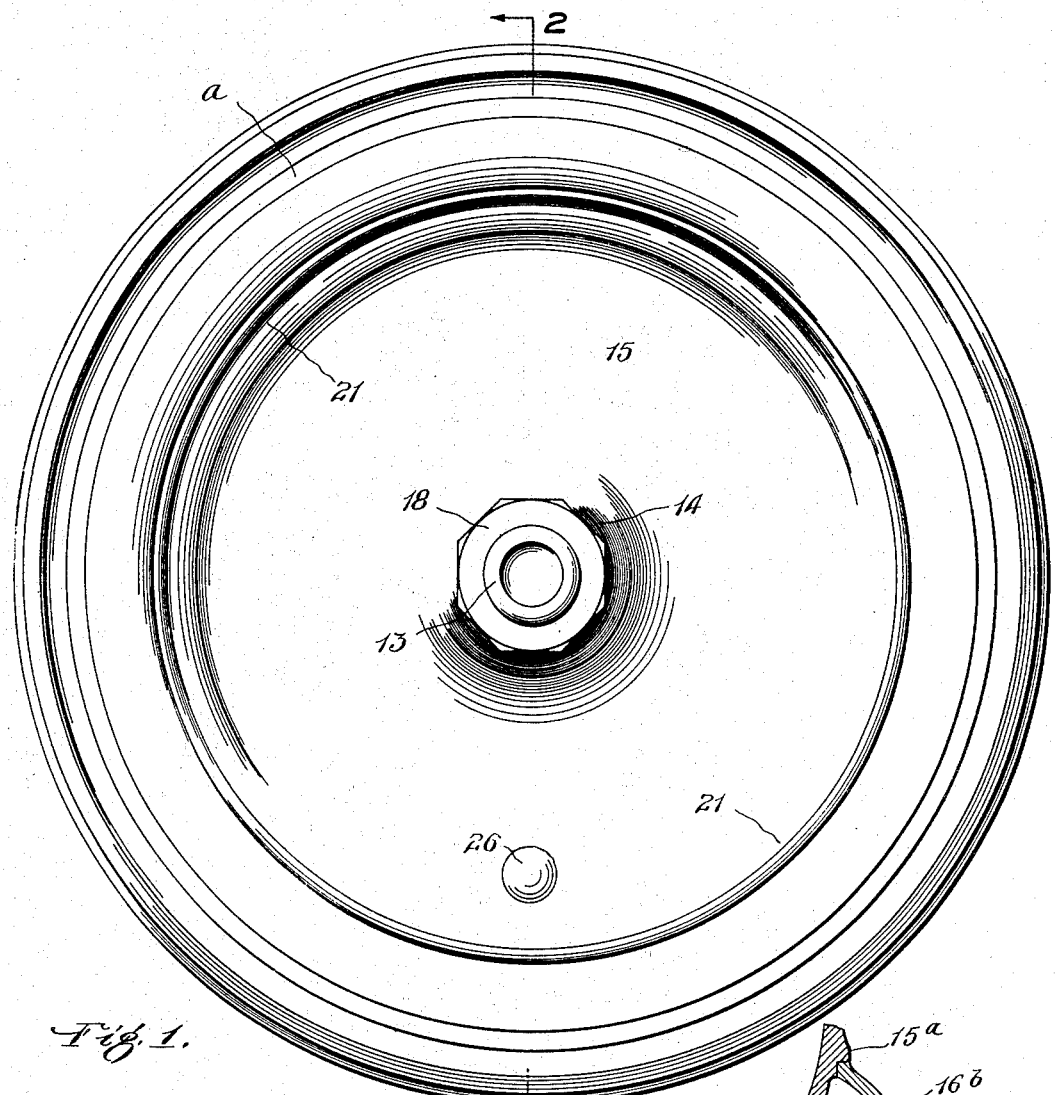
Fig. 1 is a side elevation of a complete wheel equipped with a pneumatic tire and made in accordance with my invention.

Referring to Fig. 2 which illustrates the preferred form of construction for a front wheel, a standard non-driving or fixed axle 1 is shown equipped with the ordinary non-friction bearings 2 and dirt excluding packings 3. A hub 4 is provided on its interior with seats 5 adapted to receive the outer bearing races of the bearings 2.

On the exterior of the hub 4 is formed an outwardly extending flange 8 provided with several holes 9 to accommodate driving pins which will be described later.

The exterior of the hub 4 from the base of the flange 8 toward the front end of the hub is of frustro-conical shape. The conical surface 10, which provides a seat for the hub portion of a demountable wheel 14, may be plain or serrated as desired but the plain surface may be wedged into a sufficiently close engagement with the demountable wheel to serve all desired purposes.

The outer end of the hub 4 is threaded interiorly as at 11 and exteriorly as at 12. A metallic dust cap 13 having screw threaded engagement with threads 11 serves as a means of preventing entrance of dirt or foreign particles to the bearings 2.

The demountable wheel is composed of two parts, a body member which in the construction shown is in the form of a disc 15, and a ring 16. The disc 15 is formed at its center with a hub opening 17 with walls 17ª and 17ᵇ tapered to seat upon and conform to the outer conical surface 10 of the hub member 4. Near the outer end of the opening the hub 17 is formed with an annular tapered seat 17ᶜ to receive a correspondingly tapered end of a retaining ring 18 which is screw threaded to engage with the threads 12. When the ring 18 is screwed into close engagement with the tapered seat 17ᶜ the disc is forced on the conical surface 10 of the hub and is held in frictional engagement therewith and, at the same time, the ring 18 by reason of its strong frictional engagement with the outer hub member is effectively locked against rotation. A hub cap 13 is threaded to engage with the threads 11 and serves to tightly close the bearing space. The hub cap is formed to nicely fit the aperture of the retaining ring 18, thus giving a finished appearance to the face of the wheel.

Spaced at approximately equal distances apart on the rear face of the wheel and surrounding the hub opening 17 are a number of driving pins 20. These pins are preferably composed of steel and may be secured in their pockets 20ª in the disc member in any suitable way, such for instance, as by being pressed into position. The pins project from the rear face of the disc 15 and when the disc is in assembled relation on the hub member 4, they pass through corresponding holes 9 in the flange 8 of the hub member. Motion of the hub member 4 may thus be transmitted to the disc 15 or vice versa.

The disc 15 curves smoothly from the hub portion outward radially and transversely, terminating in a tire retaining flange 21 on the front side of the wheel and an integral tire supporting flange or rim 22 extending from the flange 21 rearwardly. Disc 15, may, if desired, be provided with radial strengthening ring 15ᵇ. The rim 22 is supported at intervals with webs 22ª which join it with the main portion of disc 15. At approximately equally spaced intervals about the outer portion of disc 15, is a suitable number of rearwardly extending bosses 23 which have stud bolts 23ª secured in them in any preferred manner, such for instance as by screw threading. The rim 22 is formed with a slot 22ᵇ open at one end to receive the valve stem a' of a pneumatic tire a. This greatly facilitates assembly and disassembly of the tire.

The ring 16 is composed of a tire retaining flange 16ª similar to flange 21, and an inwardly projecting flange or ring portion 16ᵇ which is so shaped that it will meet the disc 15 at some distance from the rim 22 and be supported on a circular beveled shoulder 15ª integral with the disc 15.

Elongated nuts 24 for engagement with bolts 23ª are fitted into holes in ring 16 corresponding in number and location to the bolts 23ª. A flange 24ª upset at the inner end of each of the nuts 24 after they are in place in the ring prevents withdrawal and loss of the nuts from the ring 16. Washers 25 may be employed as shown, if desired. The nuts 24 are interiorly threaded to engage with the threaded free ends of the bolts 23ª and serve to retain the ring 16 in assembled relation with disc 15.

The free edge of the tire supporting rim 22 may rest on a flange on the ring 16 but preferably need only contact with the ring as shown in Fig. 2.

A removable disc like cover 26 permits access through an opening 26ª in the face of the wheel to the tire valve a', the sides of the opening 26ª being countersunk to permit the cover 26 to fit into the face of the wheel.

Figures 6, 7:
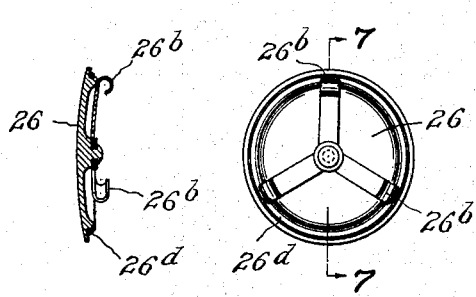
Fig. 6 is an enlarged rear elevation of the tire valve as shown in Fig. 1.
Figure 7 is a section on line 7—7, Fig. 6.

Springs 26ᵇ (Figs. 6 and 7) retain the cover in position in the wheel. One means for securing the springs to the cover is to form a lug on the rear face of the cover, pass this lug through apertures in the springs and upset the lug. The cover can readily be removed from the wheel by inserting any convenient sharp edged instrument at the edge of the cover.

A gasket such as shown at 26ᵈ can be employed to prevent rattling of the cover and leakage of liquid around it.

Figure 8:
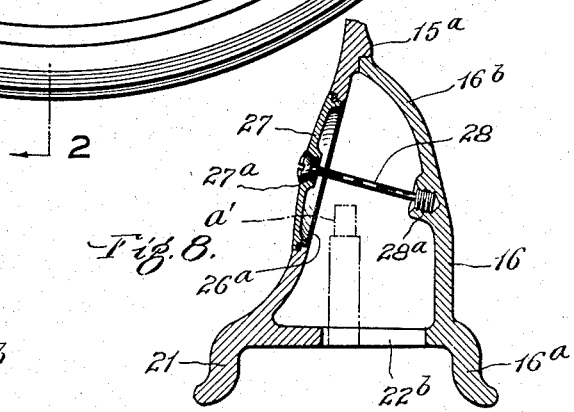
Figure 8 is a cross sectional view showing a similar cover with a modified form of securing means.

A modified form of securing means for the cover 27 as applied to the preferred form of wheel is shown in Fig. 8. A bolt 28 having a screw threaded end and a slotted head passes through a central threaded opening 27ª in the cover 27, the threaded end of the bolt engaging with a threaded socket 28ª on the ring member and securing the cover in place. Since the bolt 28 can be removed from the cover only by threading through the opening 27ª it furnishes means for removing the cover from the wheel and is not liable to be lost when the cover is removed.

In the modified structure shown in Fig. 3, driving pins 20ᵇ are secured to the flange 8 of the hub member 4 and project into corresponding pockets 29 in the wheel body or disc 31. These pockets are preferably lined with wear resisting material, such as steel, suitably secured in place. This type of driving means may be employed instead of the type shown in Fig. 2.

The essential difference between the forms of structure shown in Figs. 2 and 3 is in the formation of the outer portion of the wheel. The disc 31 which may, if desired, have radial strengthening ribs 31ª, terminates at its periphery in a tire retaining flange 31ᵇ. A rearwardly projecting flange 31ᶜ integral with the disc 31 forms a means of support for the free edge of a tire supporting rim. The ring 32 is composed of three distinct portions; namely, a tire retaining flange 32ª, a transverse tire supporting rim 32ᵇ, and an inwardly and transversely extending flange 32ᶜ. The ring 32 is detachably secured to the disc 31 by any suitable means such for instance as the stud bolts and nuts shown in Fig. 2 and already described. Also, in this construction I prefer to provide a key or pin 32ᵈ to lock this disc 31 and ring 32 against relative circumferential movement. When in assembled position, the flange 32ᶜ rests on a beveled shoulder 31ᵈ on the disc 31 while the flange 32ᵇ rests upon the flange 31ᶜ. The tire supporting rim 32ᵇ is slotted at 32ᵉ to receive the valve stem of the tire, as in the first form of construction.

In Fig. 4, a third form of structure is shown together with mountings for a rear or driving axle. The rotating live axle member is represented at 33 and the axle tube or housing at 34. Roller bearings 35ᵃ and dust packings 35ᵇ are positioned on the tube 34.

At 36 is shown a hub mounting comprising a cylinder 36ᵃ within which are secured the outer bearing races by side thrust. A flange 36ᶜ is formed on the exterior of the cylinder 36ᵃ and to it a brake drum 37 and a rear or driving hub member 38 are detachably secured.

The brake drum 37 co-operates in the ordinary manner with the brake mechanism illustrated generally by reference numeral 39.

The hub member 38, which is adapted to seat on the hub mounting 36, has, at its outer end, a longitudinal serrated bore which interlocks with corresponding serrations on the end of the live axle 33. Through these interlocking serrations, motion is transmitted from the axle to the hub and wheel. The retaining ring shown in Fig. 2 can be used interchangeably with the type of structure shown in Fig. 4.

The wheel body or disc 40 is integral at its periphery with a tire supporting rim 41 at the rear edge of which a tire retaining flange 41ᵃ is formed. Disc 40 may be strengthened by radial ribs 40ᵇ similar to corresponding ribs in the other modifications. A tire retaining ring 42 is adapted to be secured to the face of the disc 40 and to rest, at its inner edge, upon a suitably formed annular surface 40ᵃ on the face of the disc. At the outer edge of the ring a tire retaining flange 42ᵃ projects outward.

A modified means of securing the ring and the disc together is shown. It consists of bolts 43 projecting through bosses on the disc, the bolt being serrated near the head thereof to engage the metal of the bosses and thereby prevent turning of the bolts during rotation of the nut. To facilitate ready assembly and disassembly of the tire and wheel the tire supporting rim is slotted at 44 to receive the valve stem.

In Fig. 5, another modified form of wheel structure is illustrated in which the tire supporting rim 50 is a separate member resting on flanges 51 and 52 formed on the wheel body 53 and detachable ring 54, respectively. The parts of this structure may be cast but are especially adapted for rolling and forging processes of manufacture.

Each part of the complete wheels illustrating my invention is so formed that it may be easily and cheaply constructed. The disc members, as 15, 31 and 40 and the ring members, as 16, 32 and 42, when made of aluminum alloys or the like are adapted to either green sand or permanent mold methods of casting. In the green sand molds only a few simple baked cores at most would be needed while for the permanent molds the structures of the parts are such as to permit the use of very simple molds which can be operated rapidly. If these parts are made by casting in sand molds, machine work is needed to give the face portions the desired smooth finish and to bring to size the surfaces which engage other parts of the wheel. With permanent molds, however, the parts can be cast to size on all surfaces which are not to be in contact with other parts of the wheel and on such contacting surfaces the amount of material to be removed by machining is reduced to a minimum.

The hub members, as 4, can be easily and cheaply cast in semi-permanent molds. The retaining rings 18, rear hubs 38 and brake drums 37 can be forged without difficulty. The hub caps 19, dust caps 13, and hub mountings 36 can be cast.

In all modifications of my invention the wheel body, tire supporting rim and detachable ring are shaped to form an annular hollow rim structure, substantially triangular in radial cross section. One advantage of such a structure is that the weight of the peripheral portion of the wheel may be greatly decreased without a sacrifice of requisite strength. The wheel body while quite resistant to side thrusts, is strengthened materially by the detachable ring which may be clamped tightly to it. Furthermore, the side walls which define the annular rim cavity diverge as they extend outwardly forming an acute angle between them. Therefore, when the wheel is rotated, any accumulations of foreign material on the rim portion of the wheel is thrown off due to the effect of centrifugal force and the sloping side walls of the rim.

In the illustrations of my invention the discs are strong enough to withstand all ordinary stresses. The tire supporting rim is supported on a curved disc adapted to resist effectively both radial and transverse stresses and additional strength and support is provided in the ring members which form a part of the rim structure. Furthermore, said ring members are so formed and mounted on the disc that the ring securing bolts are entirely free of shearing stresses.

Provision is made against the collection of dust and dirt on the inner surface of the wheel. The slope of the flange portion 32ᶜ of the ring 32, Fig. 3, is considerably less than that of the corresponding flange 16ᵇ in Fig. 2 but either one will effectively shed mud, dirt, etc. In Fig. 4, the disc 40 merges into the rim portion at such an angle that foreign substances do not tend to collect on it.

A very important advantage in the use of aluminum alloys is that the metal is not subject to oxidation or other chemical action which will cause adherence to the tire. When a steel rim rusts, the tire is quite firmly secured to the rim at the oxidized or rusted portion thereof, making removal of the tire difficult and decreasing the life of the tire. Aluminum alloys, on the other hand, are not easily affected by atmospheric conditions and no resultant harmful action to both the wheel and tire occurs as in the case of certain other metals.

Another important feature of aluminum alloy wheels is that the heat generated in the tire during travel is quickly dissipated by reason of the good heat conducting property of the metal. The tendency is for the heat of the tire to be conducted quickly away from the region of the tire to the disc which is maintained near the temperature of the surrounding atmosphere due to the relatively large exposed surfaces.

By reference to the drawings, it will be seen that the assembly or disassembly of the tire may be easily performed. A socket wrench to turn the nuts 24 is the only tool required for this purpose. The detachable ring, as 16, in Fig. 2, may be removed by unscrewing the nuts 24 and the tire may then be moved off the rim the valve stem offering no resistance because seated in a slot which extends to the edge of the flange. Since the tire will not be attached to the wheel, as by rusting, no tools are required to move it on the rim.

In each form of construction shown the tire supporting rim is formed in one part but obviously there can be variation in this respect.

While I have set forth several illustrations of my invention I do not wish to be limited to the specific details described, the scope of the invention being defined in the appended claims.

What I claim is—

1. In a metal vehicle wheel, the combination of a disc-like body member, a separate annular member having its inner part formed to abut against the body member, one of the said members being formed with a tire-supporting rim, and means for detachably securing said members together so as to form for the outer part of the wheel an annular box-like structure.

2. In a metal vehicle wheel, the combination of a disc-like body member formed near the periphery with an annular shoulder, a separate annular member having its inner part formed to abut against said annular shoulder on the wheel body, one of said members being formed with a tire-supporting rim, and means for detachably securing said members together so as to form for the outer part of the wheel an annular box-like structure.

3. In a metal vehicle wheel the combination of a disc-like body member formed at the periphery of the disc with a tire-supporting rim, a separate annular member having its inner part formed to abut against the body member, and means for detachably securing said members together so as to form for the outer part of the wheel an annular box-like structure.

4. In a metal vehicle wheel, the combination of a disc-like body member, a separate annular member having its inner part formed to abut against the rear side of the body member, one of said members being formed with a tire-supporting rim, and means for detachably securing said members together so as to form for the outer part of the wheel an annular box-like structure.

5. In a metal vehicle wheel, the combination of a disc, a separate annular member having its inner part formed to abut against the disc, one of the said members being formed with a tire supporting rim and means disposed wholly on the rear side of the body member for detachably securing said members together so as to form for the outer part of wheel an annular box-like structure.

6. In a metal vehicle wheel, the combination of a body member, a separate annular member having its inner part formed to abut against the body member, a tire supporting rim provided with a slot open at one end to receive a tire valve, and means for detachably securing said members together so as to form for the outer part of the wheel an annular box-like structure.

7. In a metal vehicle wheel, the combination of a disc-like body member, a separate annular member having its inner part formed to abut against the body member, one of said members being formed with a tire-supporting rim, and means for detachably securing said members together so as to form for the outer part of the wheel an annular box-like structure substantially triangular in radial cross section whereby the wheel is adapted when in motion to automatically free itself of mud.

In testimony whereof, I hereunto affix my signature.

MERTON H. BLANK.